United States Patent
Kobayashi et al.

(10) Patent No.: US 7,369,683 B2
(45) Date of Patent: May 6, 2008

(54) IMAGING DEVICE (75) Inventors: Akio Kobayashi, Kyotanabe (JP); Shigeru Miki, Yao (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 513 days.

(21) Appl. No.: 10/538,872

(22) PCT Filed: Aug. 4, 2004

(86) PCT No.: PCT/JP2004/011141

§ 371 (c)(1), (2), (4) Date: Jun. 14, 2005

(87) PCT Pub. No.: WO2005/020566

PCT Pub. Date: Mar. 3, 2005

(65) Prior Publication Data

US 2006/0050154 A1    Mar. 9, 2006

(30) Foreign Application Priority Data

Aug. 8, 2003  (JP) .............................. 2003-206666

(51) Int. Cl.
G06K 9/00 (2006.01)

(52) U.S. Cl. ...................... 382/107; 382/232; 382/302; 382/236; 348/220.1; 348/221.1; 348/231.6; 358/1.14; 250/208.1; 712/1; 712/14; 712/16

(58) Field of Classification Search ............... 382/107, 382/302, 232, 236; 348/220.1, 221.1, 231.6; 358/1.14; 250/208.1; 712/1, 16
See application file for complete search history.

(56) References Cited

U.S. PATENT DOCUMENTS 5,734,424 A * 3/1998 Sasaki ...................... 348/222.1
6,967,685 B2 * 11/2005 Hamasaki ................. 348/314
6,992,707 B2 * 1/2006 Obrador ................... 348/220.1
7,057,657 B1 * 6/2006 Ishihara et al. ............ 348/312
7,315,330 B2 * 1/2008 Hamasaki ................. 348/314
2003/0095191 A1 * 5/2003 Saito ....................... 348/220.1

FOREIGN PATENT DOCUMENTS

| JP | 2001-103361 |   | 4/2001 |
| JP | 2003-125344 |   | 4/2003 |
| JP | 2003125344 A | * | 4/2003 |
| JP | 2003-158653 |   | 5/2003 |

* cited by examiner

Primary Examiner—Andrew W. Johns
Assistant Examiner—Nancy Bitar
(74) Attorney, Agent, or Firm—Kratz, Quintos & Hanson, LLP (57) ABSTRACT In an imaging device of the present invention, an imaging element 2 is driven in a thinning read-out mode for reading out signal charges from a subset of pixels, or in an all-pixels read-out mode for reading out signal charges from all pixels. When the imaging element 2 is driven in the thinning read-out mode, the imaging device processes and records a series of first image data that is obtained by reading out signal charges from the subset of pixels and that constitutes the moving images. When the imaging element 2 is driven in the all-pixels read-out mode, the imaging device processes and records a series of second image data constituting moving images after the number of pixels of the second image data is thinned, and processes and records a portion of the second image data as a still image without thinning when an instruction to pick up the still image is given while picking up the moving images.

18 Claims, 5 Drawing Sheets

IMAGING DEVICE

TECHNICAL FIELD

The present invention relates to an imaging device that can pick up a still image while picking up moving images.

BACKGROUND ART

Recently, imaging devices that can pick up a still image while picking up moving images have been proposed. These imaging devices are generally provided with a moving image processing portion for processing image data for moving images that is obtained by reading out signal charges accumulated in a solid-state imaging element such as a CCD (charge coupled device) imaging element, and a still image processing portion for processing image data for a still image that is obtained from signal charges in a similar manner. If a first button for giving an instruction to pick up moving images is pressed, the image data that has been processed by the moving image processing portion is sequentially recorded onto a recording medium. If a second button for giving an instruction to pick up a still image is also pressed while the first button is pressed, the image data that has been processed by the still image processing portion is also recorded onto the recording medium (see JP 2001-103361A, for example).

Conventional imaging devices read out signal charges from all pixels in an imaging element while moving images are picked up, and record and display the moving images by performing a thinning process that reduces the number of pixels in the image data obtained by processing the read out signal charges, in order to improve the quality of a still image that is picked up while the moving images are picked up.

However, in these conventional imaging devices, the frame rate of recorded moving images is low, since the signal charges are read out from all pixels of an imaging element while the moving images are picked up. Consequently, conventional imaging devices cannot pick up moving images showing a smooth movement of a photographic subject, although the quality of a still image that is picked up while the moving images are picked up is improved.

The present invention resolves the above-mentioned problems, and provides an imaging device that can pick up a still image while picking up moving images, in which a high-quality still image can be picked up, and also in which moving images can be picked up at a high frame rate.

DISCLOSURE OF THE PRESENT INVENTION

An imaging device according to the present invention is provided with an imaging element driven in a thinning read-out mode for reading out signal charges from a subset of pixels, or in an all-pixels read-out mode for reading out signal charges from all pixels. When moving images are picked up by driving the imaging element in the thinning read-out mode, the imaging device of the present invention processes and records a series of first image data that is obtained by reading out signal charges repeatedly from the subset of pixels and that constitutes the moving images, and processes and records a portion of the first image data as a still image when an instruction to pick up the still image is given while picking up the moving images. When moving images are picked up by driving the imaging element in the all-pixels read-out mode, the imaging device of the present invention processes and records a series of second image data that is obtained by reading out signal charges repeatedly from all of the pixels and that constitutes the moving images after the number of pixels of the second image data is thinned, and processes and records a portion of the second image data as a still image without thinning when an instruction to pick up the still image is given while picking up the moving images.

Furthermore, the imaging device of the present invention is provided with a moving image processing portion for processing the first image data without thinning when the imaging element is driven in the thinning read-out mode, and for processing the second image data after the number of pixels of the second image data has been thinned when the imaging element is driven in the all-pixels read-out mode, and a still image processing portion for receiving an input of the first or second image data for one frame that is to be recorded as a still image, and for processing the input first or second image data without thinning when an instruction to pick up the still image is given while picking up moving images.

In the imaging device of the present invention, the imaging element is driven in the in the thinning read-out mode for reading out signal charges from a subset of pixels, or in the all-pixels read-out mode for reading out signal charges from all pixels in the case of picking up moving images. When the imaging element is driven in the thinning read-out mode, a series of image data constituting the moving images can be obtained at a high frame rate, and thus moving images showing a smooth movement of a photographic subject can be picked up. Furthermore, when the imaging element is driven in the all-pixels read-out mode, image data that is to be recorded as a still image is processed and recorded without thinning, and thus a high-quality still image can be picked up while the moving images are picked up. It should be noted that when the imaging element is driven in the all-pixels read-out mode, the number of pixels of the series of image data constituting the moving images is preferably thinned to the same number of pixels of the image data obtained in the case where the imaging element is driven in the thinning read-out mode, but this process is not necessarily required.

Furthermore, the imaging device of the present invention is provided with a moving image processing portion and a still image processing portion, and thus in the case where the imaging element is driven in either the thinning read-out mode or the all-pixels read-out mode, a still image can be picked up while moving images are picked up. In addition, image data is processed by the still image processing portion in parallel with processing of the image data by the moving image processing portion, and thus even when a still image is picked up while moving images are picked up, the pick-up of the moving images is not interrupted, and the frame rate of the moving images does not become non-uniform due to an interruption of the processing of the image data constituting the moving images. Moreover, by driving the imaging element of the imaging device of the present invention in progressive scan mode, the frame rate of moving images becomes higher than that in conventional imaging devices when the imaging element is driven in the all-pixels read-out mode, and smoother moving images can be picked up.

REFERENCE SYMBOLS (2) CCD imaging element
(3) timing generator
(4) first switch
(5) CPU
(10) moving image processing portion
(11) preprocessing portion
(14) first switch
(20) recording medium
(23) third switch
(24) still image processing portion
(26) fourth switch
(29) fifth switch

BEST MODE FOR CARRYING OUT THE PRESENT INVENTION

Figure 1:
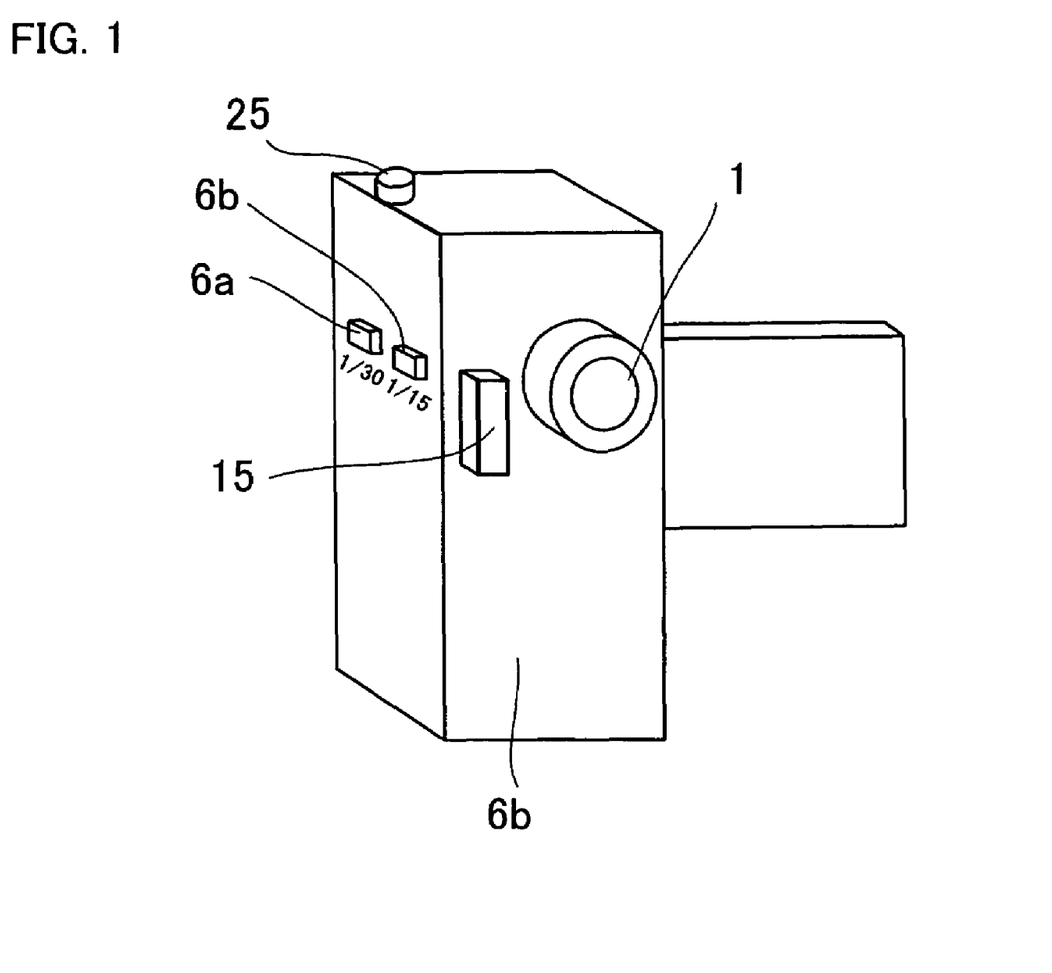
FIG. 1 is a perspective view of an imaging device according to the present invention viewed from the front side.
Figure 2:
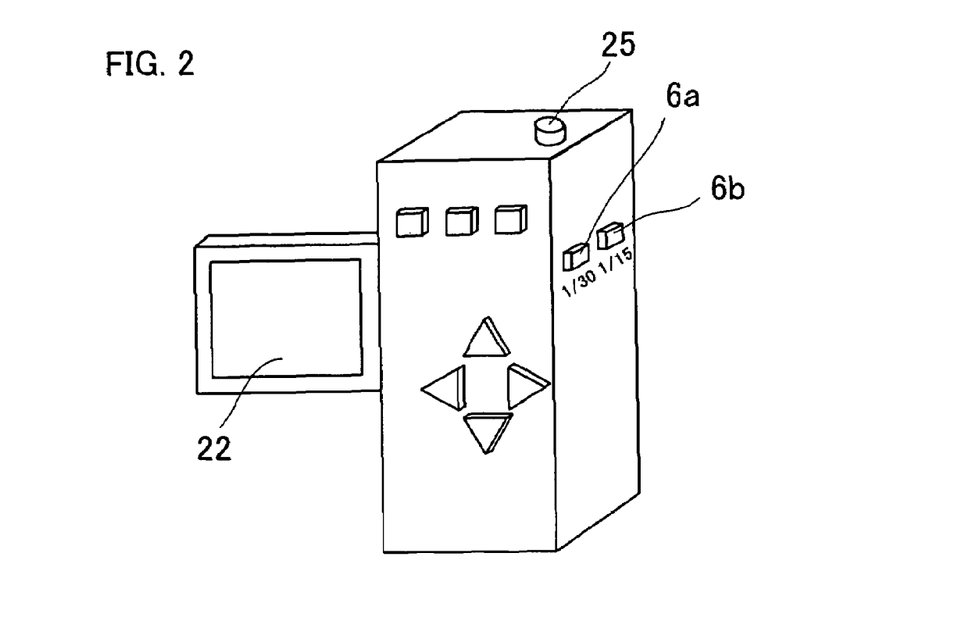
FIG. 2 is a perspective view of the imaging device according to the present invention viewed from the rear side.

Hereinafter, an embodiment of the present invention will be described with reference to the drawings. FIG. 1 is a perspective view of an imaging device according to an embodiment of the present invention viewed from the front side, and FIG. 2 is a perspective view of this imaging device viewed from the rear side. The imaging device is a digital video camera, and can pick up moving images. The front surface portion of the imaging device is provided with, for example, an imaging lens (1), and a moving image pick-up button (15) for starting an operation of picking up moving images. When the imaging device operates in a moving image pick-up mode, it picks up moving images continuously while the moving image pick-up button (15) is pressed.

The imaging device can pick up a still image while picking up moving images. The upper surface portion of the imaging device is provided with a release button (25) for starting an operation of picking up a still image. If the release button (25) is pressed in addition to the moving image pick-up button (15) while moving images are picked up, the imaging device also picks up a still image in parallel with the operation of picking up the moving images.

One side surface portion of the imaging device is provided with an LCD (liquid crystal display) (22), serving as a display portion. The LCD (22) can display a so-called through-image, and serves as an EVF (electronic viewfinder). The other side surface portion and the rear surface portion of the imaging device are provided with various buttons and switches for operation. In particular, this side surface portion is provided with select buttons (6a) and (6b) for switching moving image pick-up modes. The moving image pick-up modes include two operation modes with different frame rates of the picked up moving images, that is, a first operation mode and a second operation mode. These modes are selected by pressing one of the select buttons (6a) and (6b). When the select button (6a) is pressed, the first operation mode is selected, and moving images are picked up at a frame rate of 30 fps. When the select button (6b) is pressed, the second operation mode is selected, and moving images are picked up at a frame rate of 15 fps.

Figure 3A:
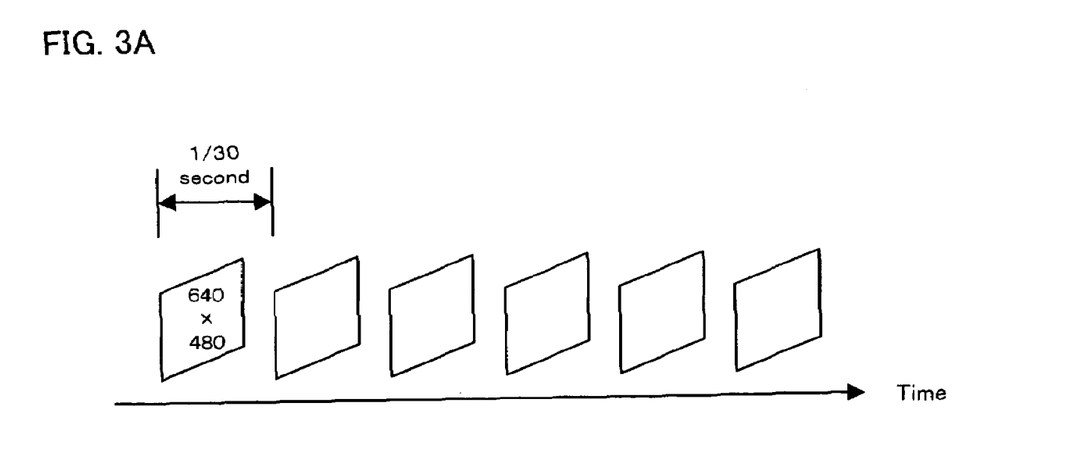
FIG. 3A is a diagram conceptually showing moving images that are picked up in a first operation mode of the imaging device according to the present invention.
Figure 3B:
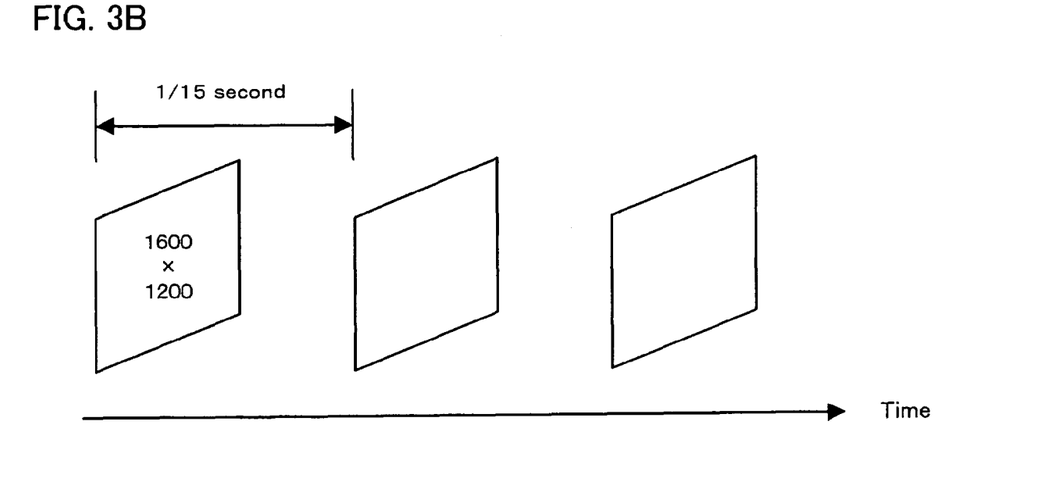
FIG. 3B is a diagram conceptually showing moving images that are picked up in a second operation mode of the imaging device according to the present invention.

FIG. 3A is a diagram conceptually showing moving images that are picked up in the first operation mode, and FIG. 3B is a diagram conceptually showing moving images that are picked up in the second operation mode. The imaging device is provided with a CCD imaging element (2) (see FIG. 4). In the first operation mode, the CCD imaging element (2) is driven in a thinning read-out mode, signal charges are read out repeatedly from a subset of pixels in the CCD imaging element (2) at a cycle of 1/30 second, and moving images are picked up at a frame rate of 30 fps. The number of pixels (the degree of sharpness) of image data at each frame constituting the moving images is VGA size (640×480).

In the second operation mode, the CCD imaging element (2) is driven in an all-pixels read-out mode, signal charges are read out repeatedly from all pixels (1600×1200) in the CCD imaging element (2) at a cycle of 1/15 second, and moving images are picked up at a frame rate of 15 fps. The number of pixels in the image data at each frame constituting the moving images is UXGA size (1600×1200).

The first operation mode is selected in the case of picking up images showing a smooth movement, since signal charges are read out from a part of pixels in the CCD imaging element (2), and a series of image data constituting an image is created at a high frame rate. The second operation mode is selected in the case of picking up a high-quality still image while picking up moving images, since signal charges are read out from all pixels in the CCD imaging element (2), and image data of a large number of pixels (with a high degree of sharpness) is created.

Figure 4:
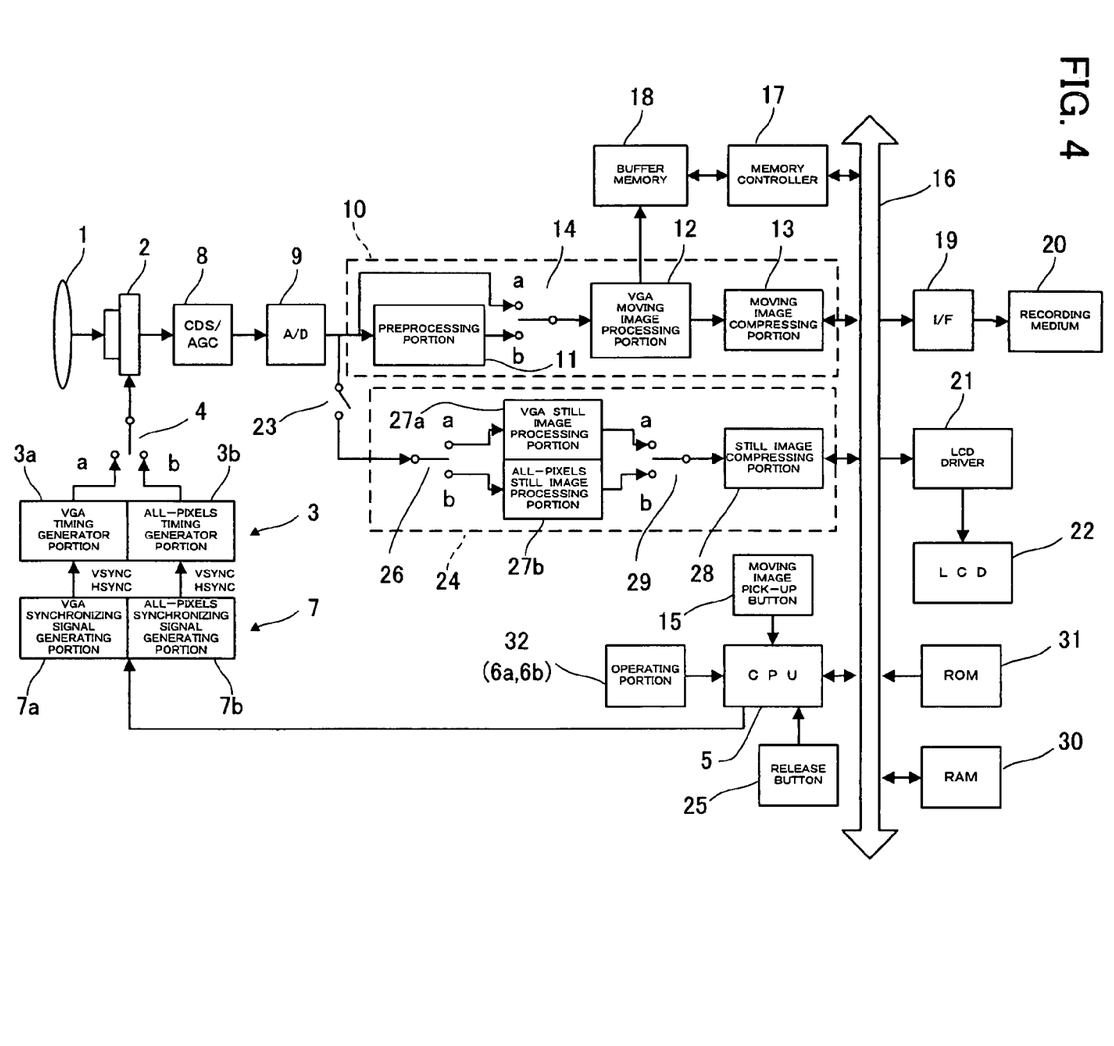
FIG. 4 is a block diagram showing a basic configuration of the imaging device according to the present invention.

FIG. 4 is a block diagram showing a basic configuration of the imaging device of this embodiment. Light coming from a photographic subject is converged by the imaging lens (1), and is incident on the CCD imaging element (2), serving as an imaging element. This incident light is photoelectrically converted by photodiodes constituting the pixels in the CCD imaging element (2), and signal charges accumulated by this conversion are read out by driving a signal-charge transferring mechanism including a large number of vertical CCDs and one horizontal CCD (neither are shown).

In contrast to a CCD driven in interlaced mode that needs a mechanical shutter and that divides all pixels into two fields to read out the signal charges, a CCD driven in progressive scan mode can read out signal charges from all pixels at a high speed. The imaging device of this embodiment drives the CCD imaging element (2) in the progressive scan mode, so that signal charges can be read out repeatedly from all pixels at a relatively short cycle (1/15 second) in the all-pixels read-out mode.

The vertical CCDs and the horizontal CCD of the CCD imaging element (2) are driven respectively by vertical driving pulses and horizontal driving pulses that are sent from a timing generator (3). The timing generator (3) is provided with a VGA timing generator portion (3a) and an all-pixels timing generator portion (3b). The VGA timing generator portion (3a) generates vertical driving pulses and horizontal driving pulses in the thinning read-out mode so that signal charges are read out from pixels of about VGA size contained in the CCD imaging element (2) at a cycle of 1/30 second. The all-pixels timing generator portion (3b) generates vertical driving pulses and horizontal driving pulses in the all-pixels read-out mode so that signal charges are read out from all pixels contained in the CCD imaging element (2) at a cycle of 1/15 second.

The CCD imaging element (2) is connected via a first switch (4) with the timing generator (3). The first switch (4) switches the driving pulses sent to the CCD imaging element (2) between the driving pulses from the VGA timing generator portion (3a) and the driving pulses from the all-pixels timing generator portion (3b). A CPU (5) switches the first switch (4) in accordance with the operation mode selected with the select buttons (6a) and (6b) (a line connecting the CPU (5) with the first switch (4) is not shown in FIG. 4, and this also the same for the other switches described below). When the first operation mode is selected with the select button (6a), the first switch (4) is set to the side of "a" shown in FIG. 4, and the driving pulses from the VGA timing generator portion (3a) are sent to the CCD imaging element (2). Thereafter, the CCD imaging element (2) is driven in the thinning read-out mode. When the second operation mode is selected with the select button (6b), the first switch (4) is set to the side of "b" shown in FIG. 4, and the driving pulses from the all-pixels timing generator portion (3b) are sent to the CCD imaging element (2). Thereafter, the CCD imaging element (2) is driven in the all-pixels read-out mode.

The timing generator (3) is connected with a synchronizing signal generator (7). The synchronizing signal generator (7) is provided with a VGA synchronizing signal generating portion (7a) and an all-pixels synchronizing signal generating portion (7b). The former supplies the VGA timing generator portion (3a) with a vertical synchronizing signal VSYNC and a horizontal synchronizing signal HSYNC that are necessary to generate driving pulses. The latter supplies the all-pixels timing generator portion (3b) with the same. The vertical synchronizing signal VSYNC is a pulse signal whose cycle is the inverse number of the frame rate. The cycle of a vertical synchronizing signal VSYNC generated by the VGA timing generator portion (3a) is 1/30 second, and the cycle of a vertical synchronizing signal VSYNC generated by the all-pixels timing generator portion (3b) is 1/15 second. When a reset signal is sent from the CPU (5) to the synchronizing signal generator (7), the VGA synchronizing signal generating portion (7a) and the all-pixels synchronizing signal generating portion (7b) start to supply a vertical synchronizing signal VSYNC and a horizontal synchronizing signal HSYNC.

The read out signal charges are converted into voltages by the CCD imaging element (2), and are output in the form of an image signal. The image signal that has been output from the CCD imaging element (2) at the cycle of the vertical synchronizing signal VSYNC undergoes such processes as correlation dual sampling and automatic gain control by a CDS/AGC portion (8), and is digitized into image data for one frame by an A/D conversion portion (9). The image data is sent from the A/D conversion portion (9) to a moving image processing portion (10).

The moving image processing portion (10) is provided with, for example, a preprocessing portion (11), a VGA moving image processing portion (12), and a moving image compressing portion (13). The image data that has been sent from the A/D conversion portion (9) is input directly, or via the preprocessing portion (11), to the VGA moving image processing portion (12). The input side of the VGA moving image processing portion (12) is provided with a second switch (14). The second switch (14) switches the input to the VGA moving image processing portion (12) between the image data output from the A/D conversion portion (9) and the image data output from the preprocessing portion (11). The CPU (5) switches the second switch (14) in accordance with the operation mode selected with the select buttons (6a) and (6b). In the image data that is output from the A/D conversion portion (9) in the first operation mode, the same number of pixels as for VGA size are read out from the CCD imaging element (2). In the first operation mode, the second switch (14) is set to the side of "a" shown in FIG. 4, and the image data that has been output from the A/D conversion portion (9) is directly input to the VGA moving image processing portion (12). In the image data that is output from the A/D conversion portion (9) in the second operation mode, all pixels are read out from the CCD imaging element (2), undergo a filtering process by the preprocessing portion (11), and are output in the form of image data in which the number of pixels is thinned to VGA size. In the second operation mode, the second switch (14) is set to the side of "b" shown in FIG. 4, and the image data that has been output from the preprocessing portion (11) is input to the VGA moving image processing portion (12).

The VGA moving image processing portion (12) divides the input image data of VGA size into R signal data, G signal data, and B signal data, and further converts them into Y signal data, B-Y signal data, and R-Y signal data by a matrix process. In the moving image pick-up mode, while the moving image pick-up button (15) is pressed, the moving image compressing portion (13) compresses the image data that has been converted into these signal data in accordance with the MPEG (moving picture experts group)-2 standard, or the MPEG-4 standard. After the compressing process, the image data is transferred via a bus (16) and a memory controller (17), and is stored in a buffer memory (18). The bus (16) is connected with the CPU (5). The CPU (5) controls the memory controller (17) so that the image data is read out from the buffer memory (18) when necessary, and controls an interface portion (19) so that the series of image data constituting the moving images is recorded onto a recording medium (20). Examples of the buffer memory (18) include SDRAMs, and examples of the recording medium (20) include memory cards and DVD-RAMs. It should be noted that uncompressed image data is sequentially sent from the VGA moving image processing portion (12) to the buffer memory (18). This image data is transferred via the bus (16) and an LCD driver (21), and is sequentially displayed on the LCD (22). The LCD (22) serves as an EVF.

When a still image is picked up while moving images are picked up, the image data that has been output from the A/D conversion portion (9) is sent via a third switch (23) to a still image processing portion (24). If the release button (25) is pressed in addition to the moving image pick-up button (15), the CPU turns on the third switch (23) for a predetermined period, and image data for one frame is sent from the A/D conversion portion (9) not only to the moving image processing portion (10) but also to the still image processing portion (24). The image data that has been sent to the still image processing portion (24) is recorded in the form of a still image.

The still image processing portion (24) processes the image data that is to be recorded in the form of a still image. The still image processing portion (24) is provided with, for example, a fourth switch (26), a VGA still image processing portion (27a), and an all-pixels still image processing portion (27b). The fourth switch (26) switches the portion to which the image data is input from the A/D conversion portion (9). The fourth switch (26) is set to the side of "a"

shown in FIG. 4 in the first operation mode, and is set to the side of "b" in the second operation mode. The image data is sent to the VGA still image processing portion (27*a*) in the first operation mode, and is sent to the all-pixels still image processing portion (27*b*) in the second operation mode. The CPU (5) switches the fourth switch (26) in accordance with the operation mode selected with the select buttons (6*a*) and (6*b*).

The VGA still image processing portion (27*a*) divides the image data of VGA size in the first operation mode into R signal data, G signal data, and B signal data, and further converts them into Y signal data, B-Y signal data, and R-Y signal data by a matrix process. The all-pixels still image processing portion (27*b*) converts the image data of all-pixels size in the second operation mode into Y signal data, B-Y signal data, and R-Y signal data in a similar manner. The image data that has been output from the VGA still image processing portion (27*a*) or the all-pixels still image processing portion (27*b*) is sent to a still image compressing portion (28). The input side of the still image compressing portion (28) is provided with a fifth switch (29). The fifth switch (29) switches the input to the still image compressing portion (28) between the image data output from the VGA still image processing portion (27*a*) and the image data output from the all-pixels still image processing portion (27*b*). The fifth switch (29) is set to the side of "a" shown in FIG. 4 in the first operation mode, and is set to the side of "b" in the second operation mode. In the first operation mode, the image data that has been output from the VGA still image processing portion (24) is input to the still image compressing portion (27). In the second operation mode, the image data that has been output from the all-pixels still image processing portion (27*b*) is input to the still image compressing portion (28). The CPU (5) switches the fifth switch (29) in accordance with the operation mode selected with the select buttons (6*a*) and (6*b*).

The still image compressing portion (28) compresses the image data in accordance with the JPEG (joint photographic cording experts group) standard. After the compressing process, the image data is transferred via the bus (16) and the memory controller (17), and is temporarily stored in the buffer memory (18). The CPU (5) controls the memory controller (17) and the interface portion (19) so that the image data is read out from the buffer memory (18) and is recorded onto the recording medium (20).

The bus (16) is connected to a RAM (30) for temporarily storing data generated in accordance with the processing by the CPU (5). The bus (16) is further connected to a ROM (31), and the ROM (31) stores, for example, a multitask OS and various control programs that are run by the CPU (5). Furthermore, the CPU (5) is connected to an operating portion (32) that has the various buttons and switches shown in FIGS. 1 and 2. The operating portion (32) includes the select buttons (6*a*) and (6*b*).

Figure 5:
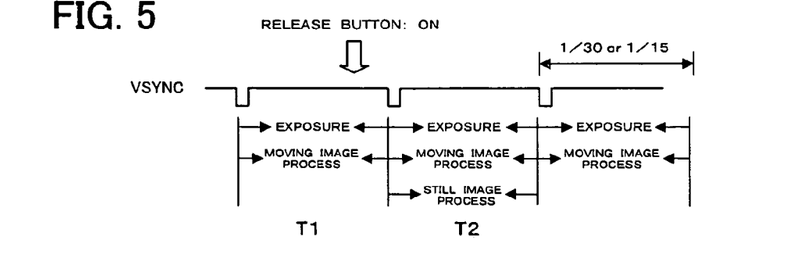
FIG. 5 is a diagram showing operations of the imaging device according to the present invention in synchronization periods in the case of picking up a still image while picking up moving images.

FIG. 5 is a diagram showing a relationship between a vertical synchronizing signal VSYNC and operations of the imaging device performed in synchronization periods in the case of picking up a still image while picking up moving images. The cycle (synchronization period) of a vertical synchronizing signal VSYNC is 1/30 second in the first operation mode, and is 1/15 second in the second operation mode. In the synchronization periods, the CCD imaging element (2) is exposed to light. When pulses of the vertical synchronizing signal VSYNC are on, the signal charges are read out, and image data obtained from the read out signal charges is processed by the moving image processing portion (10) in the next synchronization period. In the imaging device of the present invention, image data is processed by the still image processing portion (24) in parallel with the processing of the image data by the moving image processing portion (10). For example, if the release button (25) is pressed at a time during a synchronization period T1 (indicated by the arrow in FIG. 5), the signal charges accumulated by exposure in the synchronization period T1 are read out in a synchronization period T2, and image data obtained from the read out signal charges is processed by the still image processing portion (24) in parallel with processing them by the moving image processing portion (10).

Since a still image is picked up while moving images are picked up, the buffer memory (18) stores the image data constituting the moving images and the image data that is to be recorded in the form of a still image. The multitask OS that is stored in the ROM (31) and that is run by the CPU (5) records the image data constituting the moving images onto the recording medium (20), and simultaneously records the image data for the still image onto the recording medium (20). It should be noted that it is possible to record the image data that is to be recorded in the form of a still image onto the recording medium (20) after the image data constituting the moving images has been recorded onto the recording medium (20).

The imaging device of this embodiment can also pick up only a still image. If the operating portion (32) is operated to select the still image pick-up mode, the CPU (5) sets the first switch (4), the second switch (14), the fourth switch (26), and the fifth switch (29) in a similar manner to that in the second operation mode. In order to display a through-image on the LCD (22), for example, the CCD imaging element (2) operates in a similar manner to that in the above-described second operation mode, and the image data for the still image is recorded when the release button (25) is pressed. However, the series of image data that is sent to the moving image processing portion (10) is neither compressed nor recorded in the still image pick-up mode. This operation of the imaging device in the still image pick-up mode is merely one example, and it is also possible to pick up only a still image by a different operation from the above.

Figure 6:
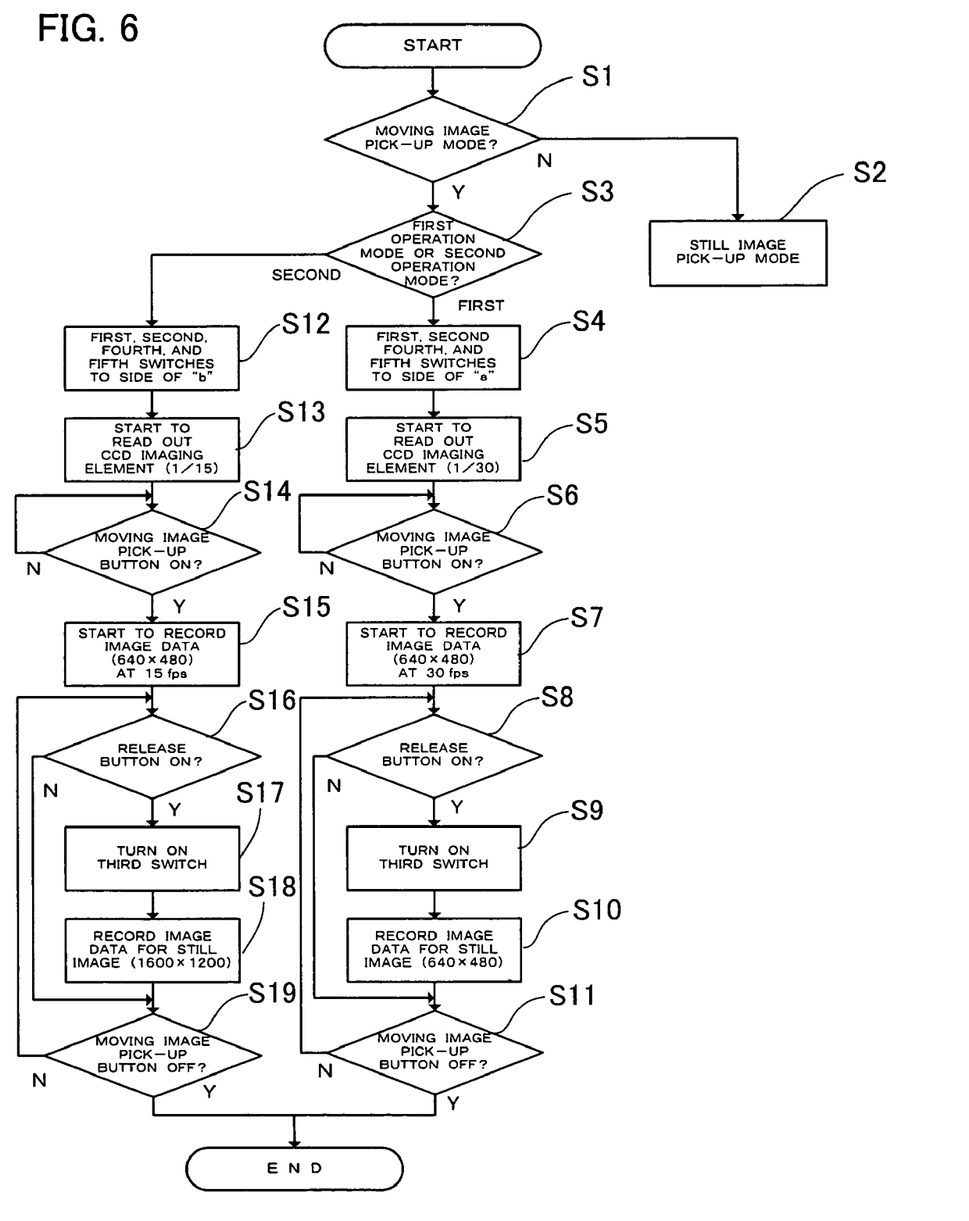
FIG. 6 is a flowchart showing operations of the imaging device according to the present invention.

Next, the image pick-up operation of the imaging device of this embodiment will be described with reference to a flowchart shown in FIG. 6. When the power of the imaging device is turned on, the CPU (5) determines whether or not the moving image pick-up mode is selected (step S1). If the moving image pick-up mode is not selected, the imaging device operates in the still image pick-up mode (or other operation mode) (step S2). If the moving image pick-up mode is selected, the CPU (5) determines which of the first operation mode and the second operation mode is selected with the select buttons (6*a*) and (6*b*) (step S3).

If the first operation mode is selected in step S3, the CPU (5) sets the first switch (4), the second switch (14), the fourth switch (26), and the fifth switch (29) to the side of "a" shown in FIG. 4 (step S4). A reset signal is sent from the CPU (5) to the synchronizing signal generator (7), and the synchronizing signal generator (7) starts to supply a vertical synchronizing signal VSYNC and a horizontal synchronizing signal HSYNC. Driving pulses are sent from the VGA timing generator portion (3*a*) in response to the vertical synchronizing signal VSYNC and the horizontal synchronizing signal HSYNC that are sent from the VGA synchronizing signal generating portion (7*a*), and the CCD imaging element (2) starts to be driven in the thinning read-out mode (step S5). The read-out cycle of signal charges is 1/30 second, and image data of VGA size obtained repeatedly by reading out the CCD imaging element (2) is sequentially processed by the VGA image processing portion (12), is transferred via, for example, the buffer memory (18), and is displayed on the LCD (22) in the form of a through-image.

The CPU (5) determines whether or not the moving image pick-up button (15) has been turned on (step S6). If the moving image pick-up button (15) is pressed, an instruction to compress the image data is given to the moving image compressing portion (13), and the image data that has been processed by the VGA image processing portion (12) and the moving image compressing portion (13) is transferred via, for example, the buffer memory (18) and is recorded onto the recording medium (20) (step S7). The frame rate of the series of image data that is recorded in the form of moving images is 30 fps.

The CPU (5) determines whether or not the release button (25) has been turned on while moving images are picked up (step S8). If the release button (25) is pressed in addition to the moving image pick-up button (15), the CPU (5) turns on the third switch (23) (step S9), and image data obtained from signal charges that are read out from the CCD imaging element (2) after the release button (25) has been pressed is sent to the still image processing portion (24). The CPU (5) records the image data of VGA size processed by the still image processing portion (24) onto the recording medium (20) in the form of a still image (step S10).

The moving images are picked up continuously in steps S8 to S10, and the image data is processed by the still image processing portion (24) in parallel with processing the image data by the moving image processing portion (10). The multitask OS that is run by the CPU (5) reads out and records the image data constituting the moving images from the buffer memory (18) onto the recording medium (20), and simultaneously reads out and records the image data for the still image from the buffer memory (18) onto the recording medium (20). The CPU (5) determines whether or not the moving image pick-up button (15) has been turned off (step S11), and ends the image pick-up operation when the moving image pick-up button (15) is released.

If the second operation mode is selected in step S3, the CPU (5) sets the first switch (4), the second switch (14), the fourth switch (26), and the fifth switch (29) to the side of "b" shown in FIG. 4 (step S12). A reset signal is sent from the CPU (5) to the synchronizing signal generator (7), and the synchronizing signal generator (7) starts to supply a vertical synchronizing signal VSYNC and a horizontal synchronizing signal HSYNC. Driving pulses are sent from the all-pixels timing generator portion (3b) in response to the vertical synchronizing signal VSYNC and the horizontal synchronizing signal HSYNC that are sent from the all-pixels synchronizing signal generating portion (7b), and the CCD imaging element (2) starts to be driven in the all-pixels read-out mode (step S13). The read-out cycle of signal charges is 1/15 second. Image data of UXGA size obtained repeatedly by reading out the CCD imaging element (2) is thinned to VGA size by the preprocessing portion (11), is sequentially processed by the VGA image processing portion (12), is transferred via, for example, the buffer memory (18), and is displayed on the LCD (22) in the form of a through-image.

The CPU (5) determines whether or not the moving image pick-up button (15) has been turned on (step S14). If the moving image pick-up button (15) is pressed, an instruction to compress the image data is given to the moving image compressing portion (13), and the image data that has been processed by the preprocessing portion (11), the VGA image processing portion (12), and the moving image compressing portion (13) is transferred via, for example, the buffer memory (18) and is recorded onto the recording medium (20) (step S15). The frame rate of the series of image data that is recorded in the form of moving images is 15 fps. The number of pixels of the image data that is recorded is that of VGA size.

The CPU (5) determines whether or not the release button (25) has been turned on while moving images are picked up (step S16). If the release button (25) is pressed in addition to the moving image pick-up button (15), the CPU (5) turns on the third switch (23) (step S17), and image data obtained from signal charges that are read out from all pixels of the CCD imaging element (2) after the release button (25) has been pressed is sent to the still image processing portion (24). The CPU (5) records the image data of UXGA size processed by the still image processing portion (24) onto the recording medium (20) in the form of a still image (step S18).

The moving images are picked up continuously in steps S16 to S18 in a similar manner to that in steps S8 to S10, and the image data is processed by the still image processing portion (24) in parallel with processing the image data by the moving image processing portion (10). The CPU (5) records the image data constituting the moving images onto the recording medium (20), and simultaneously reads out and records the image data for the still image from the buffer memory (18) onto the recording medium (20). The CPU (5) determines whether or not the moving image pick-up button (15) has been turned off (step S19), and ends the image pick-up operation when the moving image pick-up button (15) is released.

An imaging device of the present invention has been described referring to a digital video camera as the embodiment. However, the present invention may be applied widely to imaging devices that use an imaging element and that pick up a still image while picking up moving images, and also may be applied to, for example, a digital still camera including a function of picking up moving images.

The description of the foregoing embodiment is for describing the present invention, and should not be interpreted as limiting or restricting the scope of claims of the present invention. Furthermore, it goes without saying that the configuration of the parts of the present invention is not limited to the above embodiment, and that various modifications are possible within the technical scope of the claims.

INDUSTRIAL APPLICABILITY

The present invention provides an imaging device that can pick up a still image while picking up moving images, in which a high-quality still image can be picked up, and also in which moving images can be picked up at a high frame rate.

The invention claimed is:

1. An imaging device, comprising:
an imaging element driven in a thinning read-out mode for reading out signal charges from a subset of pixels, or in an all-pixels read-out mode for reading out signal charges from all pixels,
wherein if moving images are picked up by driving the imaging element in the thinning read-out mode, a series of first image data that is obtained by reading out signal charges repeatedly from the subset of pixels and that constitutes the moving images is processed and recorded, and a portion of the first image data is processed and recorded as a still image when an instruction to pick up the still image is given while picking up the moving images, and wherein if moving images are picked up by driving the imaging element in the all-pixels read-out mode, a series of second image data that is obtained by reading out signal charges repeatedly from all of the pixels and that constitutes the moving images is processed and recorded after the number of pixels of the second image data is thinned, and a portion of the second image data is processed and recorded as a still image without thinning when an instruction to pick up the still image is given while picking up the moving images.

2. The imaging device according to claim 1,
wherein the number of pixels of the second image data is thinned to the same number of pixels of the first image data.

3. The imaging device according to claim 1,
wherein the imaging element is driven in progressive scan mode.

4. The imaging device according to claim 1, comprising:
a release button for starting an operation of picking un a still image, and
a moving image pick-up button for starting an operation of picking up moving images,
wherein if the release button is pressed in addition to the moving image pick-up button while moving images are picked up, the imaging device also picks up a still image in parallel with the operation of picking up the moving images.

5. The imaging device according to claim 1,
wherein the frame rate of the series of the first image data is higher than that of the series of second image data.

6. The imaging device according to claim 5,
wherein the frame rate of the series of the first image data is 30 fps and the frame rate of the series of the second image data is 15 fps.

7. The imaging device according to claim 1,
wherein the series of the first image data and the series of the second image data are compressed in accordance with MPEG standard and recoded in the form of moving images.

8. The imaging device according to claim 1,
wherein the portion of the first image data and the portion of the second image data are compressed in accordance with JPEG standard and recoded in the form of a still image.

9. The imaging device according to claim 1, comprising:
a moving image processing portion for processing the first image data without thinning when the imaging element is driven in the thinning read-out mode, and for processing the second image data after the number of pixels of the second image data has been thinned when the imaging element is driven in the all-pixels read-out mode, and
a still image processing portion for receiving an input of the first or second image data for one frame that is to be recorded as a still image, and for processing the input first or second image data without thinning when an instruction to pick up the still image is given while picking up moving images,
wherein the processing of the image data by the still image processing portion is performed in parallel with the processing of the image data by the moving image processing portion.

10. The imaging device according to claim 9, comprising:
a CPU for controlling components of the imaging device, and
select buttons for switching the moving image pick-up modes,
wherein the CPU controls the moving image processing portion and still image processing portion in accordance with the operation mode selected with the select buttons.

11. The imaging device according to claim 9, comprising:
a CPU for controlling components of the imaging device, and
select buttons for switching the moving image pick-up modes,
wherein the CPU switches the driving pulses sent to the imaging element in accordance with the operation mode selected with the select buttons.

12. The imaging device according to claim 9,
wherein the number of pixels of the second image data is thinned to the same number of pixels of the first image data.

13. The imaging device according to claim 9,
wherein the imaging element is driven in progressive scan mode.

14. The imaging device according to claim 9, comprising:
a release button for starting an operation of picking up a still image, and
a moving image pick-up button for starting an operation of picking up moving images,
wherein if the release button is pressed in addition to the moving image pick-up button while moving images are picked up, the imaging device also picks up a still image in parallel with the operation of picking up the moving images.

15. The imaging device according to claim 9,
wherein the frame rate of the series of the first image data is higher than that of the series of second image data.

16. The imaging device according to claim 15,
wherein the frame rate of the series of the first image data is 30 fps and the frame rate of the series of the second image data is 15 fps.

17. The imaging device according to claim 9,
wherein the series of the first image data and the series of the second image data are compressed in accordance with MPEG standard and recoded in the form of moving images.

18. The imaging device according to claim 9,
wherein the portion of the first image data and the portion of the second image data are compressed in accordance with JPEG standard and recoded in the form of a still image.

* * * * *